(12) United States Patent
Zhodzishsky et al.

(10) Patent No.: US 7,495,607 B1
(45) Date of Patent: Feb. 24, 2009

(54) METHOD AND APPARATUS FOR ADAPTIVE PROCESSING OF SIGNALS RECEIVED FROM SATELLITE NAVIGATION SYSTEMS

(75) Inventors: Mark I. Zhodzishsky, Moscow (RU); Victor A. Veitsel, Moscow (RU); Oleg Potekhin, Moscow (RU); Sergey Yudanov, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 0 days.

(21) Appl. No.: 11/998,123

(22) Filed: Nov. 28, 2007

(51) Int. Cl.
*G01S 1/02* (2006.01)
(52) U.S. Cl. ............... 342/357.06; 342/357.12
(58) Field of Classification Search ............ 342/357.02, 342/357.06, 357.12, 357.15; 701/207, 213; 375/343
See application file for complete search history.

(56) References Cited

U.S. PATENT DOCUMENTS

| | | | | |
|---|---|---|---|---|
| 3,328,719 A | * | 6/1967 | De Lisle et al. | ............ 331/17 |
| 5,250,953 A | * | 10/1993 | Jones et al. | ................ 342/62 |
| 6,313,789 B1 | | 11/2001 | Zhodzishsky et al. | |
| 6,735,264 B2 | * | 5/2004 | Miller | .................. 375/340 |
| 6,816,710 B2 | | 11/2004 | Krasner | |
| 7,016,449 B2 | * | 3/2006 | Buchwald et al. | ........ 375/373 |
| 7,250,904 B2 | | 7/2007 | King et al. | |

* cited by examiner

*Primary Examiner*—Dao L Phan
(74) *Attorney, Agent, or Firm*—Weinick & Associates, LLC (57) ABSTRACT

Disclosed is an adaptive receiver configured to receive signals from satellite navigation systems to determine receiver coordinates and configured to use a co-op tracking system to evaluate full phases of carrier phases for N navigation satellites in view. The adaptive receiver includes channels with autonomous wideband phase lock loops (PLLs) in a guiding status. The wideband PLLs are configured to track phases of carrier signals from satellites having high SNR and configured to produce control codes for target designations of varying carrier frequency. The adaptive receiver also includes channels with narrow-band PLLs in a guided status. The narrow-band PLLs can track phases of carrier signals of satellites with low SNR and are configured to use target designations from the wideband PLLs in guiding status and a prediction of frequency change caused by satellite movement. The adaptive receiver also includes channels with open PLLs in a standby mode.

22 Claims, 4 Drawing Sheets

METHOD AND APPARATUS FOR ADAPTIVE PROCESSING OF SIGNALS RECEIVED FROM SATELLITE NAVIGATION SYSTEMS

BACKGROUND OF THE INVENTION

The present invention relates generally to satellite navigation system receivers and more particularly to increasing the reliability of such receivers.

Satellite navigation systems (also referred to as navigation satellites) such as GPS (USA), GLONASS (Russia) and GALILEO (Europe) are typically used to accurately determine the position of users possessing navigation receivers. A navigation receiver receives and processes radio signals transmitted simultaneously by a number of satellites. These radio signals include carrier signals which are modulated by pseudo-random binary codes (PR-codes). The codes are typically inversely modulated by binary information symbols.

Each receiver moves with the user possessing the receiver. The receiver that moves with the user is often called a Rover. In differential navigation (DN), the Rover and a Base station receive the same satellite signals from a navigation satellite. The Rover measures a time delay of when the Rover receives the satellite signals relative to when each navigation satellite transmits the signals. The Rover measures the distance (i.e., pseudorange) between the satellite and the receiver by measuring the time the signal takes to propagate from the satellite to the receiver. The pseudorange is this time offset multiplied by the speed of light.

As described above, the Base station receives the same satellite signals as the Rover. The precise coordinates of the Base station are known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base station, along with its own measurements taken with its own navigation receiver, in order to precisely determine its location. The location determination is improved in the differential navigation mode because the Rover is able to use the Base station measurements in order to compensate for the major part of the strongly correlated errors in the Rover measurements.

For each satellite, the time delay measured by the Rover is measured using scales. There is a comparative coarse scale to measure PR-code delay. A code delay is the offset between a Rover's locally generated code and code received from the satellite. Code delay is also known as PR code phase. Delays can also be measured by the phase of the carrier frequency. Such measurements have a small unambiguity range (the period of carrier frequency), but are typically more accurate.

The Rover measures delays using two loops. A Phase Lock Loop (PLL) is used to track carrier phases. A Delay Lock Loop (DLL) is used to measure code delays.

The Rover additionally includes channels. A channel consists of circuitry necessary to track the signal from a single satellite. Specifically, a single satellite channel may be considered as a basic structural unit to measure code and carrier delays relative to a single code and carrier on one frequency from a satellite. Each channel works with publicly accessible signals, for instance, the GPS C/A signal or GPS L2C or likely the GPS L3 or GLONASS C/A, etc.

Processing of the received signal involves the accumulation of successive multiplication products of this signal (which has passed through input and filtering circuits and a frequency converter). A reference carrier and reference code is generated in the receiver. The reference carrier corresponds to the carrier of the received signal for a given satellite, while the reference code corresponds to the PR-code of the same satellite. Components that are responsible for multiplication and accumulation are called correlators while the corresponding process is called correlation.

There are several ways to design channels for a receiver of the satellite signals. Each channel typically includes three paths. The first path calculates in-phase correlation signal I. This correlation signal can be obtained if a first reference carrier is in-phase with the input signal carrier while the reference code is a copy of PR-code modulating the input signal.

When a phasing error of a reference carrier $\phi$ and a time offset of a reference code $\epsilon$ exists, then, ignoring interference (for the sake of simplicity), signal I can be represented as:

$$I = \mu U_m R_0(\epsilon) \cos \phi,$$

where $\mu$ is the binary information symbol,
$U_m$ is the amplitude of the received signal, and
$R_0(\epsilon)$ is the cross correlation function of the PR-code (after passing the receiver's filter) and reference code which is a locally generated replica of PR-code for the input signal.

The second path calculates quadrature correlation signal Q. This signal can be obtained when the second reference carrier is shifted by $\pi/2$ from the first reference carrier. The correlation of the reference carrier signals generates a quadrature component of the input signal. The reference code is the same as the reference code in the first path. Signal Q may be written as follows:

$$Q = \mu U_m R_0(\epsilon) \sin \phi$$

Orthogonal signals Q and I are used for PLL phase discriminators.

The third path calculates correlation signal dl used for controlling the DLL. To obtain this signal, the first reference carrier in-phase with the input carrier is used, and the reference code consists of short strobe-pulses that match changes of sign of input PR-code chips. Note that the sign of strobe-pulses matches the sign of a chip which follows the strobe-pulse.

In order for the DLL and the PLL of a receiver's individual channels to lock onto a signal, a delay search system searches for a delay and frequency of the received signal. The delay search system sets an initial delay of the reference code to be as close as possible to the input PR-code delay. If a set error of the initial delay does not exceed the limits of a DLL lock-in range, the DLL stops at a steady balance point. The delay search system (which may include a frequency search system) may also set an initial frequency of the reference carrier with an error that does not exceed a PLL lock-in range.

During operation of the receiver, a loss of tracking in DLLs and PLLs may occur because of short-term signal loss when an object shades the receiving antenna. In this case, the delay search system has to lock onto the signal again and resume tracking once the shading is removed.

PLL and DLL bandwidths are often selected to reduce the amount of dynamic error when measuring the delay. Factors that are considered include the movement of satellites and the receiver, frequency fluctuations of a receiver reference oscillator, variations in delays of wave propagation through the atmosphere, instability of reference signal generators, etc.

As the bandwidth increases, the dynamic errors traditionally decrease. However, it is often not possible to increase the bandwidth beyond a certain bandwidth because errors from additive interference (including those caused by the receiver's intrinsic noise) increase. Furthermore, as the bandwidth increases, the risk of cycle slips and loss of lock increases. This risk is often high for channels where a satellite signal is weak, such as for low satellites or satellites partially shaded by foliage. Hence, there exists a well-known constraint which limits a threshold value of a signal-to-noise ratio (SNR) at which controlling loops can provide robust operation.

U.S. Pat. No. 6,313,789, issued on Nov. 6, 2001, describes a method of resolving the mentioned constraint by tracking common disturbances in a wide bandwidth. In particular, that patent describes using individual PLLs to track the phase of each visible satellite's carrier signal and using a common vector loop to track common carrier phase disturbances for the satellites. There is also an individual DLL in each channel for correcting the clock rate of a reference code by a controlling signal from a corresponding PLL.

In a receiver with common controlling loops, signals from individual PLLs in each channel are added to predicted and corrected signals, with the sum being used to control frequency of individual, digital, numerically controlled oscillators (NCOs) in each channel. The predicted signals are calculated by predicting the satellite movement. The prediction of satellite movement includes compensating for relevant Doppler frequency shifts for carrier frequencies as well as other factors subject to prediction. The corrected signals are generated at the output of a common vector loop that groups the receiver channels. The input of the common vector loop is an N-dimensional vector having vector components of output signals of PLL discriminators in N-channels. This vector is transformed by a least square method (LSM). As a result of the transformation, signals are provided to dynamic (loop) filters and are further projected onto the direction of each satellite, thereby forming corresponding correcting signals.

The common vector loop and N individual PLLs form a multi-loop control system. Some external influences that affect the carrier phase are common for all of the channels. They include the receiver movements and frequency fluctuations of the reference oscillator. These effects are mainly tracked by the common vector loop. Other external effects are different in different channels. They include portions of atmosphere delays, frequency fluctuations of satellite onboard reference oscillators, and errors of predicted satellite movements. These effects are mainly tracked by individual PLLs.

As common effects have a much larger impact compared with the impact of individual effects, the common vector loop typically has a much wider bandwidth and is less steady relative to individual PLLs. Tracking of code delays also benefits from the common vector loop as corrections from individual PLL signals are applied to individual DLLs.

Using both individual circuits and common PLLs, however, present risks with respect to mutual interaction of individual loops. As a result, interchannel interference may occur, which is interference on one channel from a neighboring channel. Interchannel interference may lead to tracking loss or cycle slips in PLLs of different channels after it has occurred in a PLL of one of the channels. To neutralize the interchannel interference, the signal quality in each channel is continuously estimated relative to the signal-to-noise ratio.

Alternatively, it is observed that the permissible limits of the signal quality in each channel are exceeded by an output signal of a PLL discriminator. When the signal quality falls below the permissible threshold, an alarm signal is generated. If this alarm signal has been generated on time, the corresponding channel does not use the common loops until the signal quality returns to an acceptable level. In particular, channels with temporary shading of the satellite signal do not use the common loops when the alarm signal is generated. Measurements of the shaded channel are not used for coordinate calculations.

BRIEF SUMMARY OF THE INVENTION

In accordance with an embodiment of the present invention, an adaptive navigation receiver includes separate satellite channels. The channels operate independently and one or more of the channels can track powerful satellite signals using a wide bandwidth PLL. These channels maintain a guiding status.

One or more channels can also track weaker signals by using a narrow bandwidth PLL. The operation of a narrow bandwidth PLL can be corrected by the compensation of disturbances caused by receiver motion. These channels maintain a guided status.

When the satellite signal is lost due to shading from a local object, the affected channel can be supported by a co-op tracking system. Within the co-op tracking system, corrections may be calculated. The corrections enable the extrapolation of measurements during the time of shading and may ensure fast PLL reacquisition when the signal is received again. Channel indicators allow an estimation of signal quality in the process of measurements and the changing of parameters of satellite channels. When the signal is lost, one or more channels maintain an open status. The rest of the channels maintain a search status.

These and other advantages of the invention will be apparent to those of ordinary skill in the art by reference to the following detailed description and the accompanying drawings.

DETAILED DESCRIPTION OF THE INVENTION

The reliability of satellites of different navigation satellite systems or with different positions in the constellation can vary. In particular, the quality of the signal received from a satellite may change considerably during different periods of observation (i.e., observation sessions).

Figure 1:
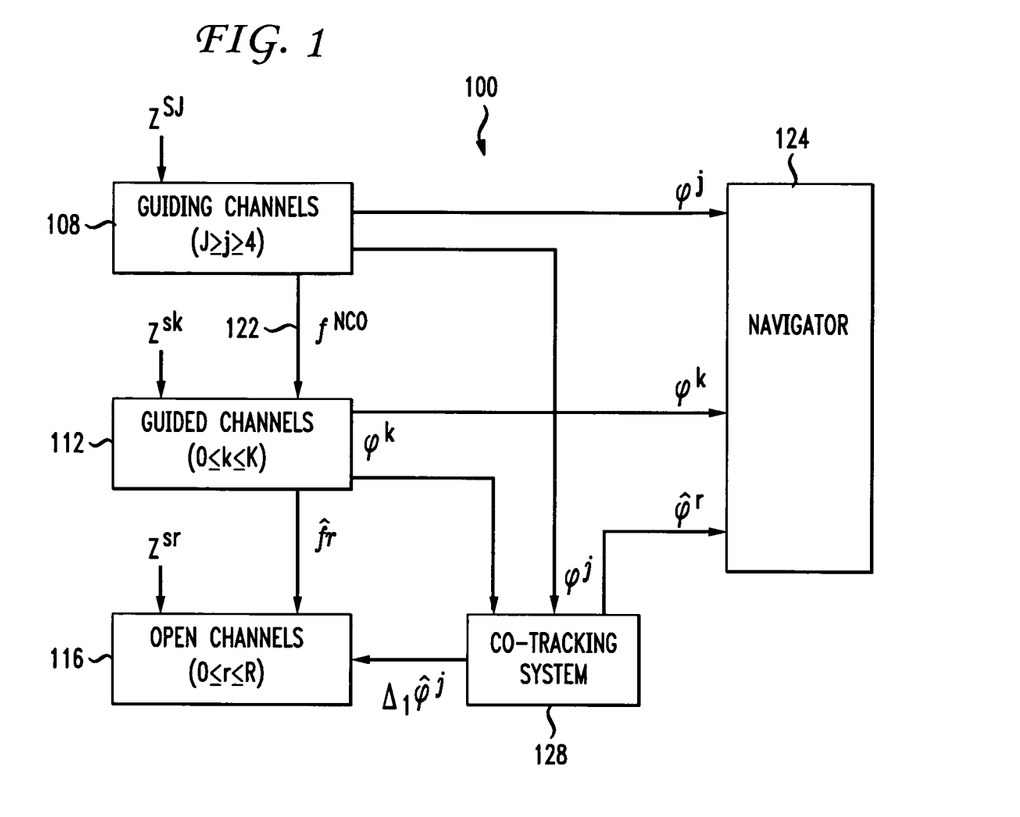
FIG. 1 is a block diagram of an adaptive navigation receiver with a plurality of channels in accordance with an embodiment of the present invention.

In accordance with an embodiment of the present invention, an "adaptive" navigation receiver includes channels which vary in operation depending on the quality of the received signal. FIG. 1 shows a block diagram of an adaptive receiver 100 having a plurality of channels that vary in operation. Each channel includes one or more PLLs and DLLs. Thus, each channel can track a satellite.

Each channel periodically (with a period $T_N$) acquires one of four possible statuses. Each status has different parameters and/or functional application. A status period $T_N$ corresponds to the period of outputting coordinate information and is selected, for instance, from 0.1 s up to 10 s.

In one embodiment, each channel can maintain (i.e., are assigned and preserve) one of the following four statuses:
- Guiding status,
- Guided status,
- Open status (also referred to as open circuit), or
- Search status.

As used herein, channels having a guiding status are referred to as guiding channels, such as guiding channels 108. Similarly, channels having a guided status are referred to as guided channels, such as guided channels 112. Channels having an open circuit are referred to as open channels, such as open channels 116. Channels having a search status are referred to as search channels. Therefore, at each period $T_N$ in the receiver, there are a different number of channels with different statuses:
- J is the number of guiding channels 108,
- K is the number of guided channels 112,
- R is the number of open channels 116, and
- the remaining channels are search channels.

As described in more detail below, channels have different functions depending on their status.

The receiver 100 performs several steps to process signals received from satellites. A search system outputs a target designation for each channel and also outputs signals locked on frequency and delay. Third order PLLs, in one embodiment with a bandwidth of 25 Hz, begin locking using frequency target designations. These third order PLLs are also referred to herein as autonomous PLLs.

The receiver 100 then determines limits of information symbols and also receives ephemerides. Once the symbol limits in each channel are determined, channel, indicators estimating signal quality begin to operate. Further, upon receipt of ephemeredes, the receiver determines its coordinates and calculates a predicted velocity and acceleration (caused by satellite movement). As described in more detail below, a co-op tracking system then begins to operate.

The output (i.e., the phase and pseudorange) of the guiding and guided channels are transmitted to a navigator 124. As is well known, the navigator 124 uses these phases and pseudoranges, along with an output from a co-tracking system 128, to determine the coordinates of the receiver 100.

In more detail about each j-th guiding channel 108 ($4 \leq j \leq J$ at each period with duration $T_N$), each j-th guiding channel 108 autonomously processes signals from one j-th satellite. A guiding channel includes autonomous PLLs and guided DLLs which together measure full phases and pseudoranges. As described above, the full phases and pseudoranges are transmitted to navigator 124 to determine the receiver's coordinates. The number of guiding channels is no less than the number of measured coordinates (including time estimates). The equivalent PLL bandwidth may be wide enough (e.g., 20-25 Hz) to track dynamic disturbances caused by receiver motion.

Signals for a target designations block of guided channels are generated in the guiding channel from the autonomous PLLs ($f^{NCO}$ 122 in FIG. 1). DLLs in the channels are additionally guided. The guided DLL acquires information about delay rate from the PLL. The DLL bandwidth can be narrower than that of PLLs (e.g., 1-4 Hz).

In one embodiment, each channel has a corresponding channel indicator block. The channel indicator block can change the status of the associated channel. In particular, the channel indicator block analyzes parameters of the received satellite signal and, if necessary, outputs a command to change the associated channel's status. Each channel indicator may be a coherent energy indicator or a phase (angular) indicator. The input values of the channel indicators are orthogonal signal components I, Q. In one embodiment of the coherent energy indicator, the components I, Q are smoothed by a sliding average method for the time approximately inverse to the PLL bandwidth. For example, for the guiding PLL, the time is 40 ms. As a result, signals $I_0$ and $Q_0$ are determined.

At each period (with duration $T_N$), an energy quality signal is generated and is given by the following equation:

$$S_A = [(I_0)^2 + (Q_0)^2]$$

Signal $S_A$ is proportional to the input signal power and can be recalculated to get an estimate of energy potential, or signal-to-noise ratio (SNR) within 1 Hz band, for the channel of a given satellite. The energy quality signal may characterize relative tracking accuracy of the PLL. This enables using the signal to assign weight coefficients W in LSM transformations.

A phase quality signal is also generated in a phase detector. The phase detector is similar to a PLL discriminator. The signal is further smoothed (e.g., with the help of operator $\Sigma$).

$$S_P = \Sigma abs(Q_0/I_0)$$

The command to change the status is generated either on the basis of the signal $S_A$ or according to the combination of the signals $S_A$ⱮS$_P$.

In one embodiment, signal $S_A$ is compared with a high threshold and a low threshold. If $S_A$ is no less than the high threshold, the channel in consideration is considered a guiding channel. If $S_A$ is between the low and high thresholds, the channel is a guided channel. An open circuit is assigned if $S_A$ is less than the low threshold. In one embodiment, the high threshold is set at a SNR of 40-45 dB/Hz, and the low threshold is set at the level of 25-30 dB/Hz. In another embodiment, the open circuit is assigned if either $S_A$ is less than the low threshold or $S_P$ exceeds 0.2-0.5 rad. Channel indicators function at each and every status, but threshold values may be set in different ways depending on the status.

In more detail about each k-th guided channel 112 ($0 \leq k \leq K$ at each period with duration $T_N$), each k-th guided channel processes a k-th satellite signal when the signal is too weak (according to channel indicators) for the wideband PLL. The equivalent PLL band of the guided channel (e.g., 5-7 Hz) is narrower than that of the guiding channels (e.g., 20-25 Hz). To reliably track receiver motion, a guiding signal from the target designation block, which receives information from the guiding channels, is applied to the guided channel PLL.

Full phases and pseudoranges of the guided channel are transferred to the navigator 124. Further, a command from the channel indicators can change the status of the guided channel from guided status to guiding status or open circuit.

The open circuit is assigned to an r-th satellite channel ($0 \leq r \leq R$) if the block of channel indicators indicates that the power of the r-th signal is not sufficient to reliably track the PLL and/or if its measurements are abnormal. Such a situation does not typically last a long time and may be caused by short-term shading from a local object or fading of the signal because of heavy interference. A channel may, for example, have an open circuit for 10-20 s, and then the channel obtains a guided status or a search status.

The measurements of the open channel are not transmitted to the navigator 124, but tracking the phase of the shaded signal is still occurring due to extrapolation. In one embodiment, tracking systems of the open channel work in a standby mode and wait for a command to change the status. Once the command to change status (to "guiding" or "guided" status) is received, the standby mode ensures that tracking of the r-th satellite signal resumes without a new search and lock. Further, the PLL begins tracking at the same steady point without a cycle slip.

A search channel searches for and locks onto satellite signals. The search channel can search for a newly arisen satellite by frequency and signal delay. At the beginning of an observation session, most of the receiver channels are assigned a search status. In the session, a free channel is assigned a search status according to a command based on information about a new satellite in the visible zone or about a channel with a signal lost for a predetermined time period (e.g., 10-20 s).

As described above, the receiver 100 also includes a co-op tracking system 128. The co-op tracking system 128 improves the satellite tracking ability of the receiver 100. This improvement is based on two types of simultaneous PLLs (i.e., dual-circuit PLL). One PLL circuit tracks the apparent dynamics of the receiver, including the receiver dynamics and internal oscillator. This PLL circuit uses the total power of all the satellites in view and can have a wide bandwidth on the order of 20 Hz. The second type of PLL circuit is designed to track the apparent dynamics of each satellite channel. There is a dual circuit PLL dedicated for each channel. These individual loops have comparatively narrow bandwidths of about 2 Hz. The co-op tracking system 128 may enable the tracking of the satellite signals in areas of high interference.

In more detail, the co-op tracking system co-processes and estimates full phases of the guiding and guided channels and performs a phase correction for the open channel in standby mode when the satellite signal has been missed. The correction changes the channel's status from an open circuit to a guided status as soon as the signal appears without a special search by frequency and delay. It also ensures that the PLL is kept at the same steady point.

The co-op tracking system 128 may additionally estimate phase for all channels, including open channel(s) 116. The co-op tracking system 128 can take into account phase changes of the open channel caused by movement of the receiver when estimating phase. In one embodiment, information about active channels (i.e., channels producing tracking) is used. In addition, correction for slow individual phase drifts for shading time may be extrapolated.

Figure 2:
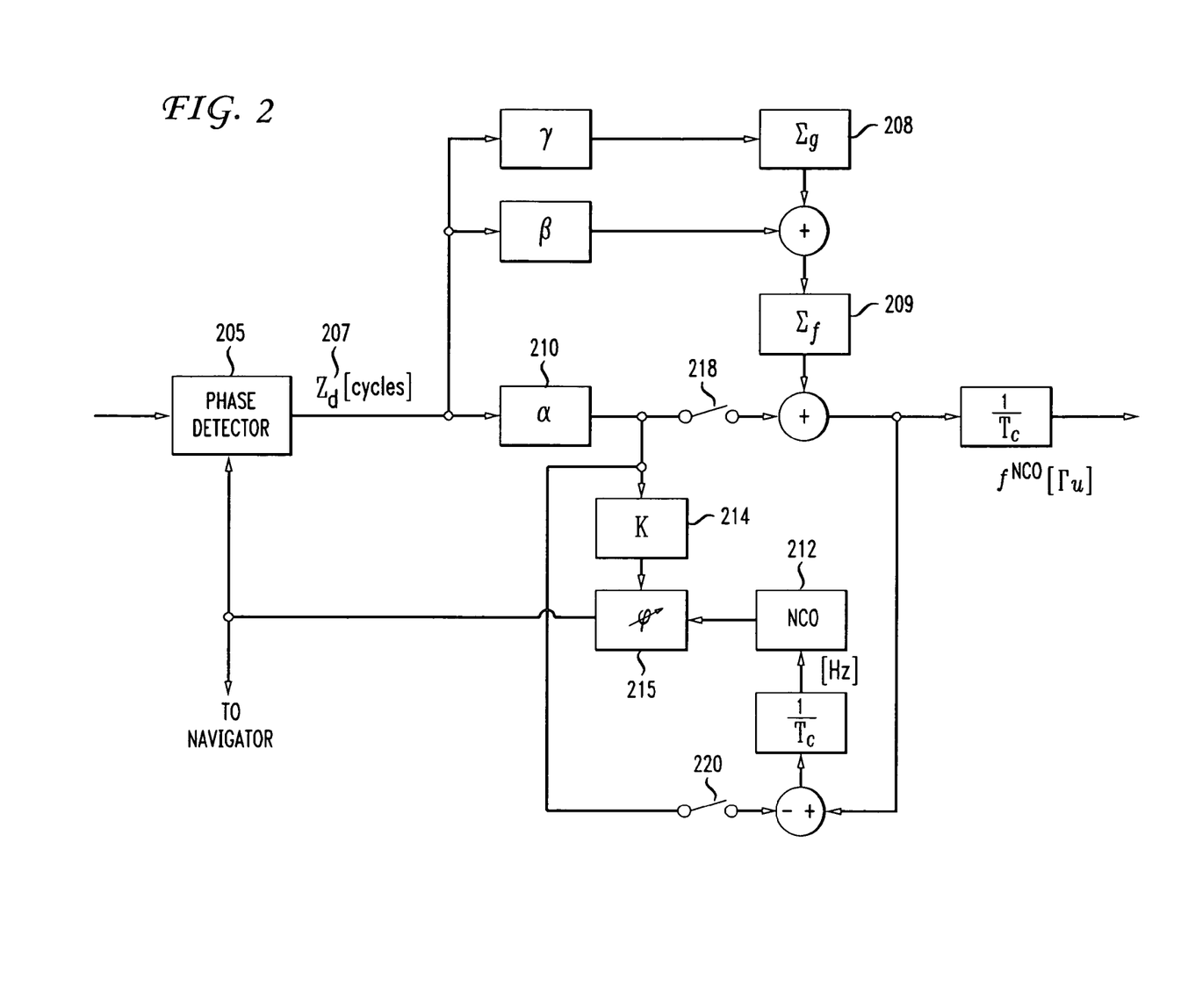
FIG. 2 is a more detailed block diagram of a guiding channel in the plurality of channels of FIG. 1 in accordance with an embodiment of the present invention.

FIG. 2 is a more detailed block diagram of one of the guiding channels 108 of FIG. 1. In particular, FIG. 2 shows an embodiment of a PLL for one j-th guiding channel. The PLL measures the full phase of a j-th satellite signal carrier and outputs control signals $f_{j\,NCO}$ for guided channels.

There are switches which are controlled by a status change command. The switches can connect additional blocks and change parameters of main blocks.

Full phase measurements are carried out by a digital third order (astaticism) PLL with frequency-phase control. Control frequency of the PLL is selected in a range of, for example, 150-250 Hz. A phase detector (PD) 205 outputs an error signal $Zd_j$ 207 according to the equation:

$Zd_j = a \tan(Q_j/I_j)$

To increase noise immunity, several steps may be taken. For example, the sign of received binary symbols $\hat{\mu}$ may be evaluated and removed. Thus, the following expression is calculated:

$\bar{Q} = \hat{\mu}Q; \bar{I} = \hat{\mu}I$

After this, component $\bar{I}$ can be filtered with a filter having the same bandwidth as the bandwidth of the PLL. The result of the filtering is $\tilde{I}$. The error signal 207 is then calculated using the equation: $Z_{d_j} = a \tan(\bar{Q}/\tilde{I})$.

The error signal 207 passes a loop filter determining astaticism order and PLL bandwidth. In one embodiment, the loop filter includes two integrating circuits with accumulators $\Sigma_g$ 208 and $\Sigma_f$ 209. The loop filter also includes a proportional circuit 210 with a transfer function of a. The PLL bandwidth has a value in a range of, for example, 20-25 Hz.

The output of the integrating circuits of the loop filter controls the frequency of an NCO 212. Using an accumulator block 214 and digital phase shifter 215, the output of a proportional circuit 210 adds a phase shift to the output phase of NCO 212, with the reference signal being generated on the former of the orthogonal components.

The frequency applied to the NCO 212 of the guiding PLLs is generated as a sum of the calculated Doppler frequency shift $Z^{sj1} \ldots Z^{s4}$ (satellite movement) and a frequency shift from the loop filter. The latter shift is a sum of shifts caused by the reference instability and Doppler shift (receiver movement).

A first switch 218 and a second switch 220 are closed for 5 ms at a time (i.e., a period of 5 ms). When the switches 218, 220 are closed, a frequency control signal is applied to guided channels.

Figure 3:
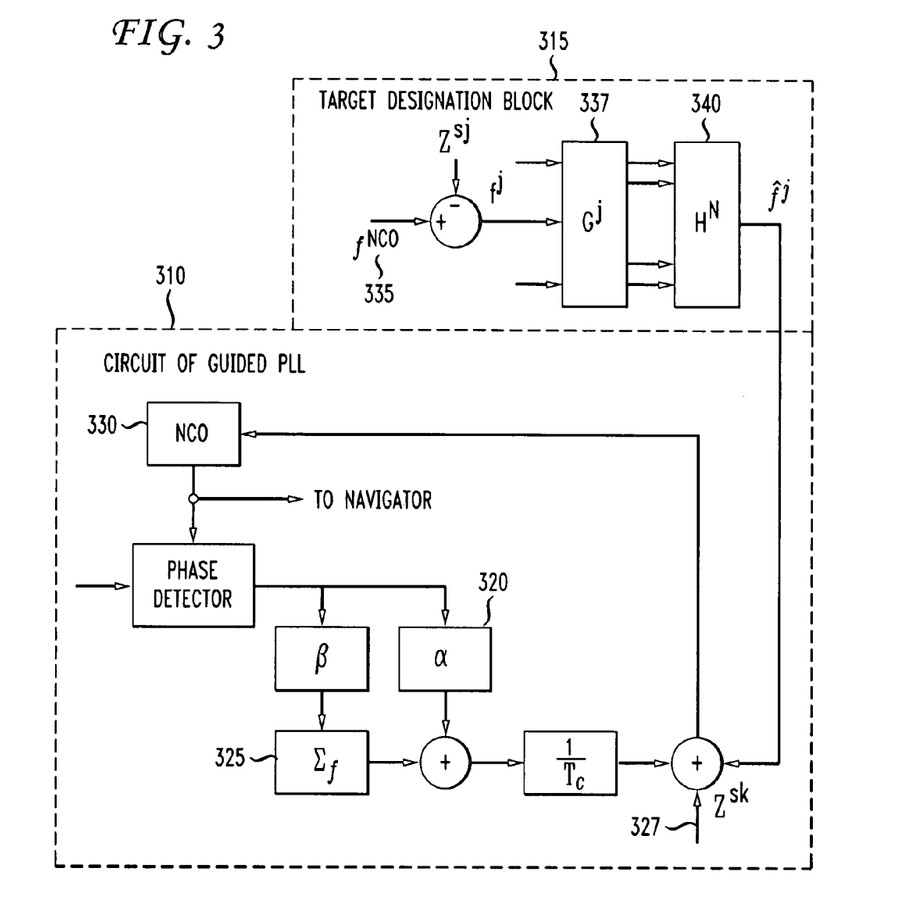
FIG. 3 is a more detailed block diagram of a guided channel in the plurality of channels of FIG. 1 in accordance with an embodiment of the present invention.

FIG. 3 is a more detailed block diagram of one of the k-th guided channels 112 shown in FIG. 1. In one embodiment, the guided channel includes two main components. The first component is the main circuit 310. The second component is a target designation block 315.

As described above, phase detector 205 outputs signal $Zd_k$ 207 to the loop filter. The second order loop filter of a guided channel consists of a proportional circuit 320 with transfer function a and an integrating circuit with accumulator $\Sigma_f$ 325. Prediction signal $Z_{Sk}$ 327 is then transmitted into the loop to compensate for frequency changes caused by movement of the k-th satellite and a guiding signal $f_k$ from target designation block 315. The PLL is closed through an NCO 330 of the guided channel.

If frequency control of NCO 330 is used, a common frequency control signal 335 from each guiding PLL is provided to a matrix G 337 in the guided channel. If separate frequency-phase control of NCO 330 is used (as shown in NCO 212 of FIG. 2), then an equivalent frequency control signal from each guiding PLL is provided to matrix G 337. The equivalent frequency control signal is a sum of the real frequency control signal from the common output of the integrating circuits and the shift of NCO phases (divided by controlling cycle $T_c$) generated by the proportional circuit. The same signal is used for controlling the DLL.

Target designation block 315 receives control code $f_{j\,NCO}$ 335 from each guiding satellite (from the j-th satellite). A prediction of frequency change of the corresponding guiding satellite is subtracted from this control code 335. The obtained differences are processed with LSM (matrix G) 337 and then projected onto the satellite directions of guided channels (matrix H) 340. As a result, guiding signals $f_k$ are formed for the guided channels (for each k-th channel).

Figure 4:
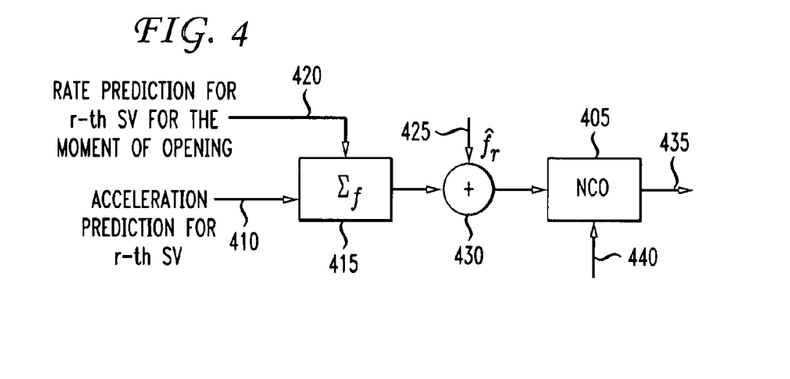
FIG. 4 is a more detailed block diagram of an open channel in the plurality of channels of FIG. 1 in accordance with an embodiment of the present invention.

FIG. 4 is a more detailed block diagram of an embodiment of an open channel. The command to open the loop at a certain moment is sent from channel indicators. From the beginning of the next period $T_N$, NCO 405 of this channel is controlled by signals of movement prediction for the r-th satellite and signals from the co-op tracking system.

A prediction of acceleration 410 for the r-th satellite is transmitted to an accumulator $\Sigma_f$ 415, and the accumulator

415 outputs a current frequency increment. This value is added to predicted frequency 420 of the same satellite at the moment of opening. Then a frequency estimate 425 (with a period of $T_N$) from the output of the r-th channel of matrix H (e.g., matrix H 340 of FIG. 3) is transmitted into a summation block 430. The obtained frequency controls the NCO 405 during shading of satellite signals. Output 435 of the NCO 405 is used to generate orthogonal components $I_r$, $Q_r$, transmitted to the channel indicator.

Once a satellite signal is no longer shaded (e.g., by foliage), the channel indicator outputs the command to change the status of the signal to a "guided" status. The NCO phase is additionally corrected by a signal 440 from the co-op tracking system (as described in more detail below).

In one embodiment, if the satellite signal is lost for longer than, e.g., 10-20 s, the open channel is changed to a search channel.

Figure 5:
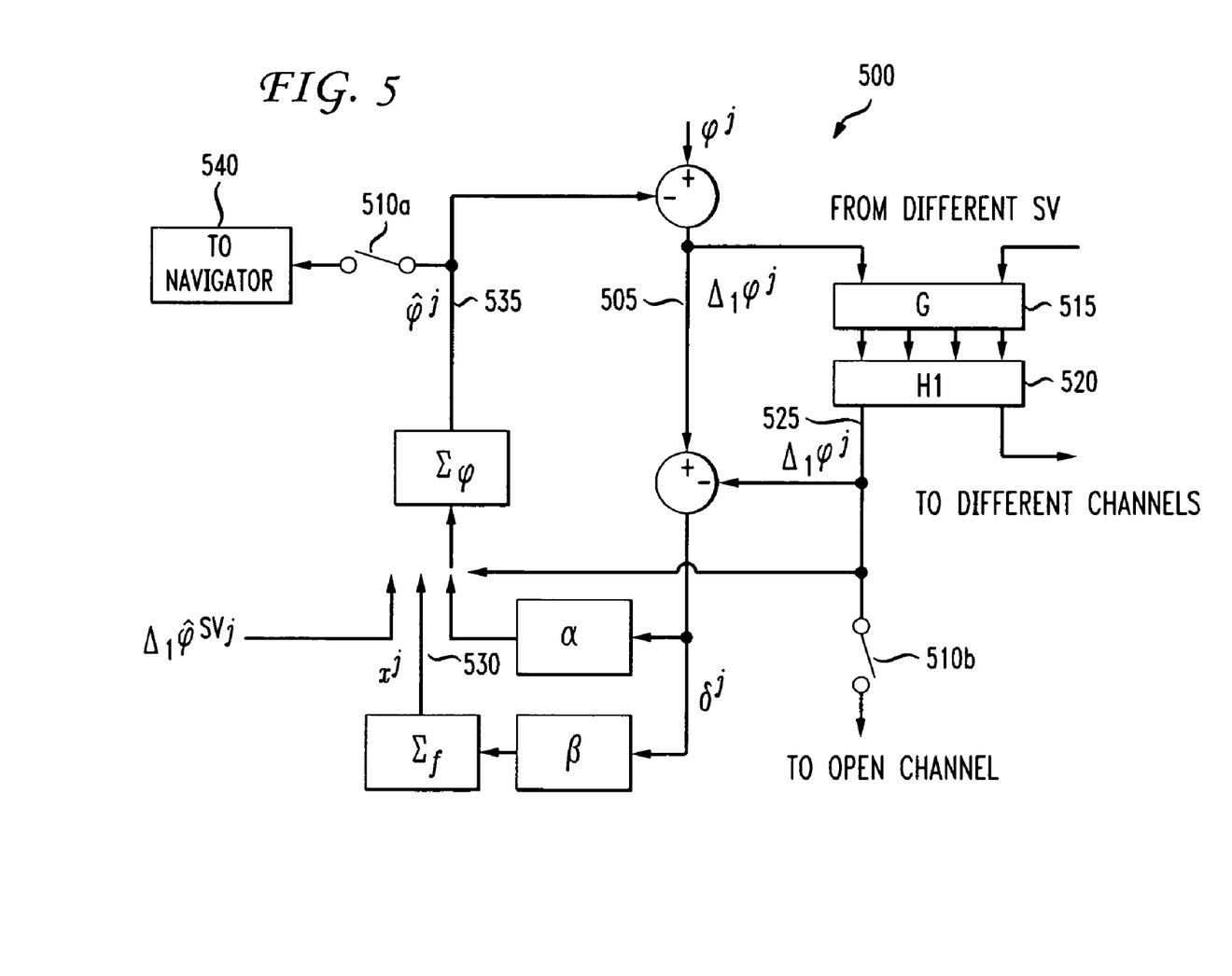
FIG. 5 is a block diagram of a co-op tracking system in accordance with an embodiment of the present invention.

FIG. 5 is a block diagram of an embodiment of a co-op tracking system 500. Full phases $\phi^j$, $\phi^k$ of guiding and guided channels are input into the co-op tracking system 500.

Target designations $\Delta_1\hat{\phi}^j$ 505 for open channels are produced from full phases of these open channels. Target designations $\Delta_1\hat{\phi}^j$ 505 are used to predict and correct NCO phase when a satellite is shaded. This occurs when switches 510a, 510b are closed.

In one embodiment, the co-op tracking system 500 includes (J+K) narrow-band individual loops (according to the number of guiding and guided satellites) and a plurality (e.g., 4) proportional common loops (e.g., according to coordinates x, y, z, cτ).

Common loops (more precisely, their matrices G 515 and H 520) produce target designations $\Delta_1\hat{\phi}_i^j$ (e.g., signal 525) for all satellites from the set of full phases $\phi^i$ using received satellite signals. These target designations are equal to the estimates of full phase increments (obtained with the LSM) caused by movement of the receiver and quartz fluctuations.

Each individual loop generates a rate estimate $x^j$ 530 of effects caused by atmosphere fluctuations, ephemeris inaccuracies and instability of the onboard reference. This estimate is used to predict a full phase $\hat{\phi}^j$ 535 at satellite shading (in the open channel). During shading, the full phase $\hat{\phi}^j$ 535 may provide navigator 540 with information that can be used to determine the receiver's coordinates.

Optimal parameters of individual loops depend on the period $T_N$. For example, at $T_N=1$ s, the optimal parameters may be $\alpha=0.51$; $\beta=0.09$; $\Delta f_a=0.17$ Hz. For $T_N=0.1$ s, the optimal parameters may be $\alpha=0.51$; $\beta=0.009$; $\Delta f_a=1.32$ Hz. For $T_N=0.02$ s, the optimal parameters may be $\alpha=0.16$; $\beta=10^{-3}$; $\Delta f_a=2$ Hz.

The sequence of calculations in the co-op tracking system 500 may occur as follows, where the superscript SV means that the value is obtained in calculation of satellite moving prediction.

i is the number of period $T_N$ (epoch), j is the number of satellite channel:

1) Calculation of full phase prediction:

$$\bar{\phi}_i^j = \hat{\phi}_{i-1}^j + \Delta_1\hat{\phi}_i^{SV} + x_{i-1} \quad (1)$$

where $\hat{\phi}_{i-1}$ is the final estimate of full phase at the previous epoch, i.e., at (i−1)-th;

$x_{i-1}$ is the value in the accumulator $\Sigma_f$, $\Delta_1\hat{\phi}_i^{SV}$ is the prediction of full phase increments for the time from (i−1)-th and i-th epochs caused by satellite moving.

2) Calculation of difference between the observed full phase $\phi_i^j$ and its prediction $\bar{\phi}_i^j$:

$$\Delta_1\phi_i^j = \phi_i^j - \bar{\phi}_i^j \quad (2)$$

3) Calculation of target designation $\Delta_1\hat{\phi}_i^j$ for all the channels using the LSM processing difference $\Delta_1\phi_i^j$ only for active (guiding and guided) satellites. To do this, the following steps are performed:

a) compile a vector of differences $\Delta_1\phi_i^j$ for active satellites (with dimension J+K);

b) compile matrix $H_1$ of directional cosines for these satellites, adding a unit column;

c) compile a vector of weight coefficients W for active satellites;

d) calculate a matrix for these satellites $G=(H_1^T W H)^{-1}$;

e) multiply matrix G by the vector of differences, thereby obtaining a 4-component vector of deviations for geometric coordinates $\Delta x$, $\Delta y$, $\Delta z$ and time $c\cdot\Delta_\tau$;

f) produce another matrix $H_1$ using all the satellites (guiding, guided, open channels);

g) multiply this matrix $H_1$ by 4-component vector of deviations of geometric coordinates and time, hence obtaining target designations for all the satellites.

4) Calculation of residuals for guiding and guided channels:

$$\delta_i^j = \Delta_1\phi_i^j - \Delta_1\hat{\phi}_i^j \quad (3)$$

5) Correction of the state vector:

$$x_i = x_{i-1} + \beta\delta_i \quad (4)$$

$$\hat{\phi}_i = \bar{\phi}_i + \alpha\delta_i + \Delta_1\hat{\phi}_i^j \quad (5)$$

6) Calculation of corrected phase for the open channel NCO $$\hat{\phi}_i^j = \hat{\phi}_{i-1}^j + \Delta_1\hat{\phi}_i^{SVj} + \Delta_1\hat{\phi}_i^j + x_p^j \quad (6)$$

All these calculations are produced with period $T_N$. Value $x_p^j$ is determined for the moment of satellite shading and, during the time of shading, it does not change.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An adaptive receiver configured to process carrier signals received from a plurality of navigation satellites to determine receiver coordinates comprising:

a co-op tracking system configured to evaluate full phases of received carrier signals;

a plurality of channel indicators configured to generate status commands indicating one of a plurality of statuses, said statuses comprising a guiding status, a guided status, an open status, and a search status;

a plurality of adaptive channels, each configurable in response to said status commands such that:

an adaptive channel configured to operate in said guiding status comprises an autonomous wideband phase lock loop (PLL) which tracks phases of received carrier signals having a signal-to-noise ratio (SNR) above a first threshold, said channel further configured to produce control codes for target designations of varying carrier frequency, an adaptive channel configured to operate in said guided status comprises a narrow-band PLL which tracks phases of received carrier signals having a SNR above a second threshold and below said first threshold, said channel further configured to use said target designations and a prediction of frequency change caused by navigation satellite movement, an adaptive channel configured to operate in said open status comprises an open PLL in a standby mode and configured to use a prediction of frequency changes caused by satellite movement and target designations from said co-op tracking system to extrapolate full phases during satellite shading and to prepare for locking once said satellite shading is finished, and an adaptive channel configured to operate in said search status is configured to search for and lock onto carrier signals.

2. The adaptive receiver of claim 1, wherein said channel indicators are configured to estimate signal quality of an adaptive channel.

3. The adaptive receiver of claim 2, wherein the channel indicators are configured to estimate the signal quality of an adaptive channel periodically with a period $T_N$.

4. The adaptive receiver of claim 3, wherein the period $T_N$ is selected from a range of 0.1-10 s.

5. The adaptive receiver of claim 2, wherein each of said channel indicators determines signal-to-noise ratio and generates an energy quality signal $S_A$ on the basis of:

$$S_A = [(I_0)^2 + (Q_0)^2],$$

where $I_0$ and $Q_0$ are orthogonal components of an input signal smoothed by a sliding average method for a time approximately inverse to the PLL bandwidth.

6. The adaptive receiver of claim 5, wherein an indicator outputs a guiding status command if said energy quality signal exceeds said first threshold, outputs a guided status command if the energy quality signal exceeds said second threshold but is less than said first threshold, outputs an open status command if the energy quality signal is less than said second threshold, and outputs a search status command if an adaptive channel is assigned an open status for more than a predetermined time.

7. The adaptive receiver of claim 6, wherein said first threshold is within an interval of about 40-45 dB/Hz and said second threshold is within an interval of about 20-25 dB/Hz.

8. The adaptive receiver of claim 2, wherein channel indicators comprise an energy indicator generating said energy quality signal $S_A$ and phase indicator generating a phase quality signal Sp according to $$S_P = \Sigma \mathrm{abs}(Q_0/I_0)$$

and said energy indicator generating an energy quality signal $S_A$.

9. The adaptive receiver of claim 8, wherein PLL goes to open status if said phase quality signal $S_P$ is above a threshold that is approximately equal to 0.2-0.5 rad.

10. The adaptive receiver of claim 1, wherein said control codes for target designations of varying carrier frequency are obtained from frequency registers of said autonomous wideband PLL.

11. The adaptive receiver of claim 10, wherein said control codes are processed with a least square method and projected onto satellite directions to form target designations for said narrow-band PLL.

12. The adaptive receiver of claim 1, wherein said co-op tracking system comprises narrowband individual loops according to a number of guiding and guided channels and four proportional common loops according to coordinates x, y, z, cτ.

13. The adaptive receiver of claim 12, wherein a vector of measured full phases from said wideband PLLs and said narrow-band PLLs is transmitted to an input of said common loops and is processed to output optimal estimates of full phases and target designations of phase increments for each channel.

14. The adaptive receiver of claim 13, wherein said estimates and target designations are used in an open channel where signals are shaded for a period of time.

15. The adaptive receiver of claim 14, wherein said co-op tracking system is configured to perform the following steps with period $T_N$:

1) calculate a full phase prediction:

$$\bar{\phi}_i = \hat{\phi}_{i-1} + \Delta_1 \hat{\phi}_i^{SV} + x_{i-1}$$

where $\hat{\phi}_{i-1}$ is a final estimate of full phase at the previous epoch, i.e., at (i−1)-th;

$x_{i-1}$ is the value in the accumulator $\Sigma_P$, $\Delta_1 \hat{\phi}_i^{SV}$ is the prediction of full phase increments for the time from (i−1)-th and i-th epochs caused by satellite movement;

2) calculate a difference between the observed full phase $\phi_i^j$ and its prediction $\bar{\phi}_i^j$:

$$\Delta_1 \phi_i^j = \phi_i^j - \bar{\phi}_i^j$$

3) calculate a target designation $\Delta_1 \hat{\phi}_i^j$ for the channels using the LSM processing difference $\Delta_1 \phi_i^j$ only for channels comprising a wideband PLL and a narrow-band PLL, wherein to perform this step the co-op tracking system performs the following steps:

a) compile a vector of differences $\Delta_1 \phi_i^j$ for active satellites with dimension J+K, b) compile matrix $H_1$ of directional cosines for said active satellites, adding a unit column, c) compile a vector of weight coefficients for active satellites W, d) calculate a matrix for said active satellites W, said matrix $G = (H_1^T W H)^{-1}$, e) multiply said matrix G by the vector of differences to obtain 4-component vector of deviations for geometric coordinates $\Delta x$, $\Delta y$, $\Delta z$ and time $c \cdot \Delta_\tau$, f) produce another matrix $H_1$ using satellites transmitting carrier signals associated with channels comprising a wideband PLL, a narrow-band PLL, and an open PLL, h) multiply this matrix $H_1$ by 4-component vector of deviations of geometric coordinates and time to obtain target designations for all the satellites;

4) calculate residuals for channels comprising a wideband PLL and a narrow-band PLL:

$$\delta_i^j = \Delta_1 \phi_i^j - \Delta_1 \hat{\phi}_i^j$$

5) correct the state vector:

$$x_j = x_{i-1} + \Delta \delta_i$$

$$\hat{\phi}_i = \bar{\phi}_i + \Delta \delta_i + \Delta_1^j; \text{ and}$$

6) calculate corrected phase for an NCO of an adaptive channel having an open PLL $$\hat{\varphi}_i^j = \hat{\varphi}_{i-1}^j + \Delta_1 \hat{\varphi}_i^{SVj} + \Delta_1 \hat{\varphi}_i^j + x_p^j.$$

16. The adaptive receiver of claim 1, wherein said adaptive channel having open status is further configured to receive frequency target designations from a target designation block in a guided channel as well as phase corrections from said co-op tracking system when said shading is finished.

17. The adaptive receiver of claim 1, wherein, at each period $T_N$, a navigator uses full phases from guiding and guided channels as well as full phase estimates of open channels from said co-op tracking system to calculate coordinates.

18. A method for processing carrier signals received from a plurality of navigation satellites using a plurality of adaptive channels to determine receiver coordinates, the method comprising:

evaluating full phases of received carrier signals by a co-op tracking system;

generating, by a plurality of channel indicators, status commands indicating one of a plurality of statuses, said statuses comprising a guiding status, a guided status, an open status, and a search status;

in response to a guiding status command, configuring an adaptive channel to operate in a guiding status at which an autonomous wideband phase lock loop (PLL) tracks phases of received carrier signals having a signal-to-noise ratio (SNR) above a first threshold, said channel is further configured to produce control codes for target designations of varying carrier frequency;

in response to a guided status command, configuring an adaptive channel to operate in a guided status at which a narrow-band PLL tracks signals having a SNR above a second threshold and below said first threshold and uses said target designations and a prediction of frequency change caused by navigation satellite movement;

in response to an open status command, configuring an adaptive channel to operate in a standby mode at which PLL opens, full phase is extrapolated and re-locking is prepared to be carried out once the shading is finished using a prediction of frequency changes caused by satellite movement and target designations from said co-op tracking system; and in response to a search status command, configuring an adaptive channel to operate in a search status ensuring further searching for and locking onto carrier signals.

19. The method of claim 18, further comprising estimating signal quality of an adaptive channel using said plurality of channel indicators.

20. The method of claim 19, wherein said estimating further comprises generating an energy quality signal $S_A$ on the basis of:

$$S_A = [(I_0)^2 + (Q_0)^2],$$

where $I_0$ and $Q_0$ are orthogonal components of an input signal smoothed by a sliding average method for the time approximately inverse to the PLL bandwidth.

21. The method of claim 20, wherein a channel indicator outputs a guiding status command if the energy quality signal exceeds said first threshold, outputs a guided status command if the energy quality signal exceeds said second threshold but is less than said first threshold, outputs an open status command if the energy quality signal is less than said second threshold, and outputs a search status command if an adaptive channel is assigned an open status for more than a predetermined time.

22. The method of claim 18, further comprising receiving, by an adaptive channel comprising an open PLL, frequency target designations from a target designation block of said adaptive channel comprising a narrow-band PLL as well as phase corrections from said co-op tracking system.

\* \* \* \* \*

UNITED STATES PATENT AND TRADEMARK OFFICE
CERTIFICATE OF CORRECTION

PATENT NO. : 7,495,607 B1  Page 1 of 1
APPLICATION NO. : 11/998123
DATED : February 24, 2009
INVENTOR(S) : Mark I. Zhodzishsky et al.

It is certified that error appears in the above-identified patent and that said Letters Patent is hereby corrected as shown below:

Column 12, line 65, " $x_j = x_{i-1} + \Delta \delta_i$ " should read -- $x_i = x_{i-1} + \beta \delta_i$ --

Column 12, line 67, " $\hat{\varphi}_i = \overline{\varphi}_i + \Delta \delta_i + \Delta_1 \hat{\ }_i^j$ ; and" should read -- $\hat{\varphi}_i = \overline{\varphi}_i + \alpha \delta_i + \Delta_1 \hat{\varphi}_i^j$ ; and --

Signed and Sealed this

Ninth Day of March, 2010

David J. Kappos
*Director of the United States Patent and Trademark Office*